United States Patent [19]

Poné, Jr.

[11] 4,179,214
[45] Dec. 18, 1979

[54] PHOTOGRAPHIC PRINTER CONTROL SYSTEM

[75] Inventor: John Poné, Jr., Minneapolis, Minn.

[73] Assignee: Pako Corporation, Minneapolis, Minn.

[21] Appl. No.: 867,897

[22] Filed: Jan. 9, 1978

[51] Int. Cl.² .............................................. G03B 27/78
[52] U.S. Cl. ....................................... 355/35; 355/38; 355/68
[58] Field of Search .................................. 355/35–38, 355/68, 69, 83, 88, 133, 67, 70, 71; 364/200 MS File, 900 MS File

[56] References Cited

U.S. PATENT DOCUMENTS

| | | | |
|---|---|---|---|
| 3,516,741 | 6/1970 | Thaddey | 355/38 |
| 3,744,034 | 7/1973 | Paul | 364/200 |
| 3,768,903 | 10/1973 | Steinberger et al. | 355/38 |
| 3,800,288 | 3/1974 | Russell et al. | 364/200 |
| 3,984,637 | 10/1976 | Caudill et al. | 364/200 |
| 4,068,943 | 1/1978 | Gyori | 355/38 |

OTHER PUBLICATIONS

The Kodak 2610 Color Printer.

Primary Examiner—L. T. Hix
Assistant Examiner—W. J. Brady
Attorney, Agent, or Firm—Kinney, Lange, Westman and Fairbairn

[57] ABSTRACT

A photographic printer control system of the present invention separates the operation of the printer into first and second working levels. The first (or "operator") working level includes selecting the printing mode, loading or selecting one of a plurality of setup blocks, initiating printing, and applying color density button corrections. The second (or "manager") working level includes determination of printer operating parameters for each setup block, selection of automatic corrections to be applied, color balancing, calibration, and totalizing. A control panel supplies input signals which select and control operation on the first and second working levels. A security system is provided to limit access through the control panel to the first working level for all persons except authorized persons such as the lab manager. The regular operator of the printer, therefore, normally cannot initiate operation on the second working level and thereby disrupt operating parameters, color balance, calibration, or totals which have been selected by the lab manager.

10 Claims, 7 Drawing Figures

| ID# | TYPE | SIZE | WB BL | ADC | SNRA | FPC | DENSITY | R | G | B | MODE |
|---|---|---|---|---|---|---|---|---|---|---|---|
| REFER DENSITY = | | | | | | | | | | | |

| ID# | TYPE | SIZE | WB BL | ADC | SNRA | FPC | DENSITY | R | G | B | MODE |
|---|---|---|---|---|---|---|---|---|---|---|---|
| 09 | KII | 135 | WB | 1 | 1 | 1 | +2 | +1 | +0 | -1 | A |

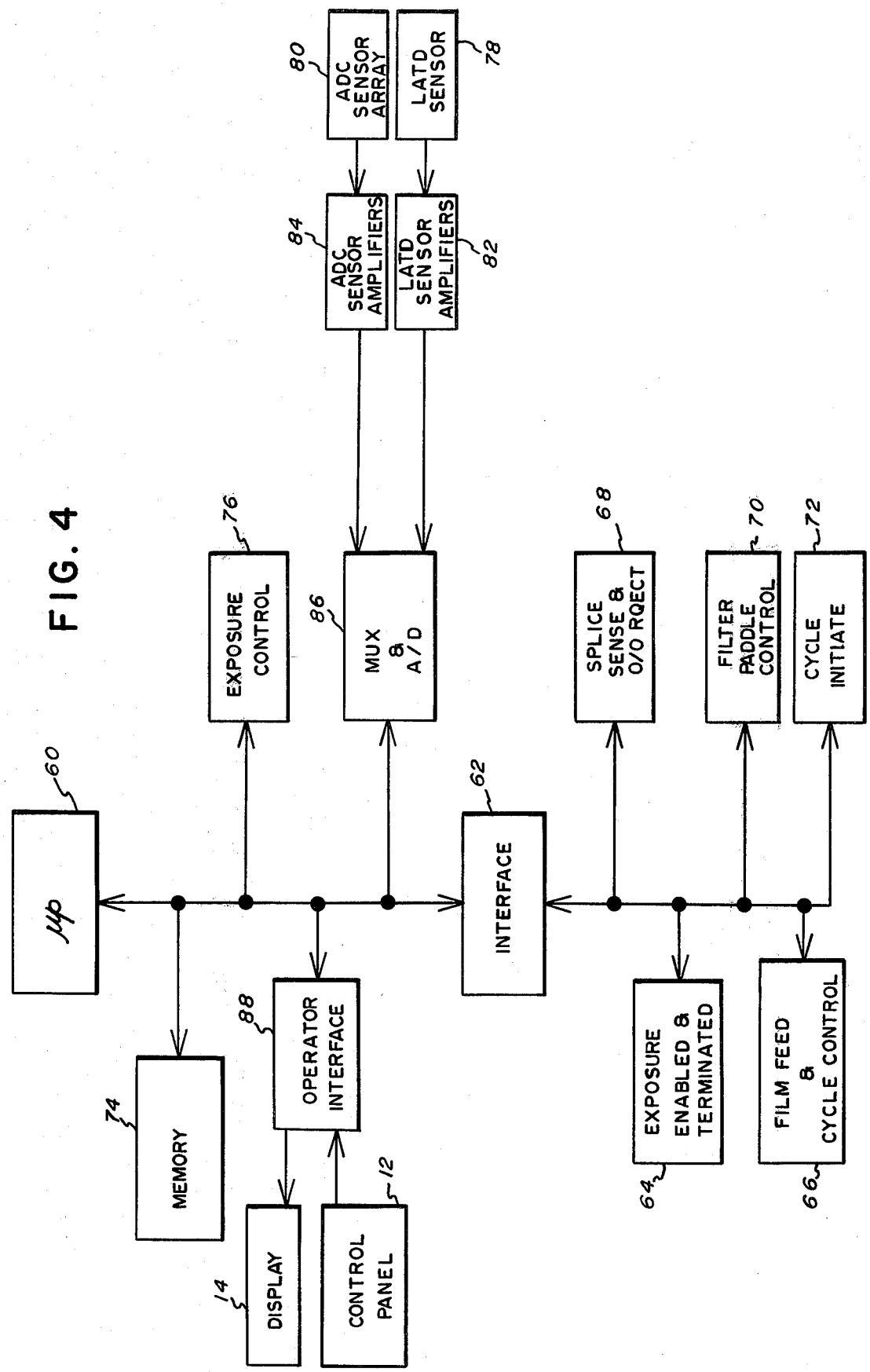

PHOTOGRAPHIC PRINTER CONTROL SYSTEM

BACKGROUND OF THE INVENTION

The present invention relates to a photographic printing system. In particular, the present invention is an improved photographic printer control system which is organized with distinct and separate working levels.

Photographic printers produce color or black and white prints or transparencies from photographic film originals (generally negatives). High intensity light is passed through the film and imaged on the photosensitive print medium (film or paper). The photographic emulsion layers on the print paper or film are exposed and subsequently processed to produce a print of the scene contained in the film original.

The significant advances in digital electronics and digital computers in recent years has led to the development of computer controlled photographic printers. These computer controlled photographic printers have typically required a data entry and printout device such as a keyboard and printer through which the operator provides control instructions to be carried out by the computer. Despite the significant advantages of digital computer control for photographic printers, there have also been significant disadvantages in the prior art systems. In particular, the use of computer controls and a computer peripheral data entry system may require a more sophisticated printer operator than was required in the past. In addition, the likelihood of accidental or unauthorized changes to critical operating parameters of the printer system, to the color balances of the printer system, to level settings and calibration, and to totals which may be stored by the computer have increased significantly. An accidental or unauthorized change can result in significant loss of printer time, and the waste of considerable amounts of print paper.

SUMMARY OF THE INVENTION

The present invention is a photographic printer control system which is particularly well-suited to digital computer control of a photographic printer. Two distinct, separate working levels are established, and the printer control means accepts input command signals from the user on these two levels.

The first working level includes the initiation of printing and may also include a selection of one of a plurality of setup blocks for different film/photosensitive medium combinations. The second working level includes the determination of control information used in controlling printing. In particular, this second working level may include determination of critical printer operating parameters for the plurality of setup blocks, color balancing of the printer, calibration of various subsystems of the printer, and totalizing of operating information.

In order to avoid accidental or unauthorized changes in the critical operating parameters, color balances, calibration settings, and totals, security means are provided which normally permit input signals to affect operation of the printer only on the first working level. Input signals are permitted to affect operation of the printer on the second working level only if an authorization or access condition is met.

BRIEF DESCRIPTION OF THE DRAWINGS

FIG. 4 is an electrical block diagram of a control system used in one embodiment of the present invention.

DETAILED DESCRIPTION OF THE PREFERRED EMBODIMENTS

Figures 1, 3A, 3B:
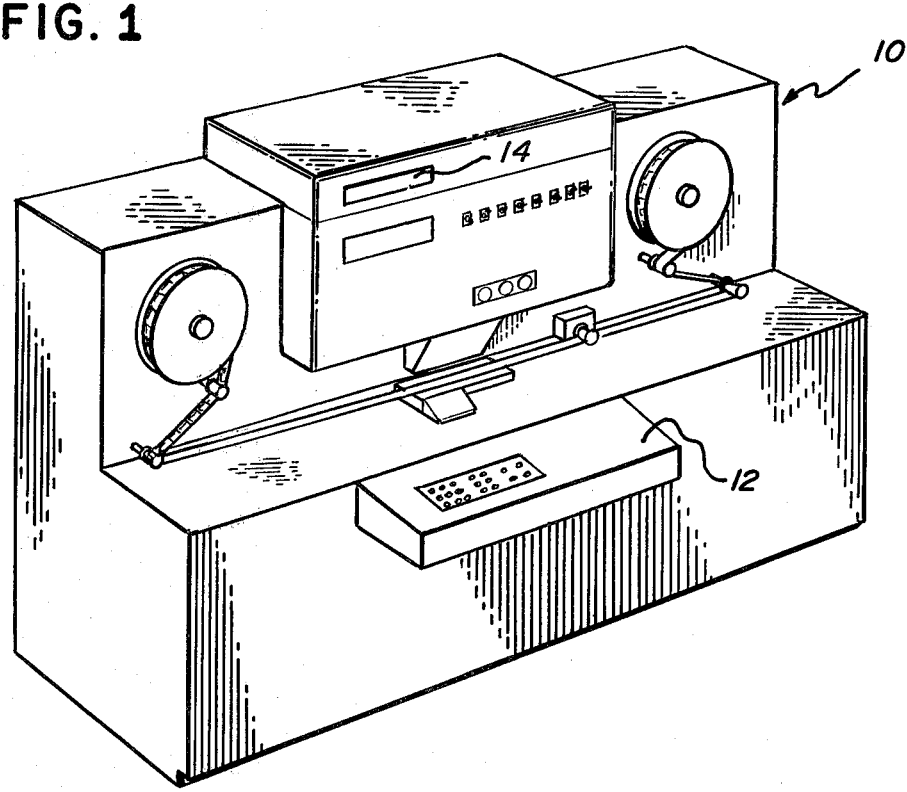
FIG. 1 shows a photographic printer which utilizes the control system of the present invention.
FIGS. 3A and 3B show a display of the photographic printer of FIG. 1 as it displays a message to the operator during setup and as it displays setup status information during normal operation, respectively.

FIG. 1 shows a photographic printer 10 which utilizes the control system of the present invention. Printer 10, which produces photographic prints or transparencies from a photographic film original, has two separate working levels. In the first working level, or "operator level", the normal operator may select a printing mode, select and load one of a plurality of setup blocks for the particular film/paper size combination being used, may initiate printing, and may apply color/density corrections. The second working level, which may be termed the "manager level", permits highly sophisticated critical adjustments to be made to the operation of the printer. These adjustments may include determining critical printer operating parameters for each of a plurality of setup blocks, color balancing the printer, calibrating various subsystems of the printer, and totalizing operation information.

Printer 10 includes a control panel or "beak" 12 having a keyboard for entering and recalling color balance and other setup parameters, for controlling the operation of the printer 10, and for entering individual color/density corrections. Printer 10 also includes an alphanumeric display 14, which allows the user of the printer to monitor any interaction with the printer, notifies the user of existing error conditions, displays operation information, displays setup values, and displays other messages or instructions.

Control panel 12 and display 14 are used in controlling both the operator level and the manager level. Interactive operation between the user and printer 10 is achieved through the combined operation of control panel 12 and display 14.

Figure 2:
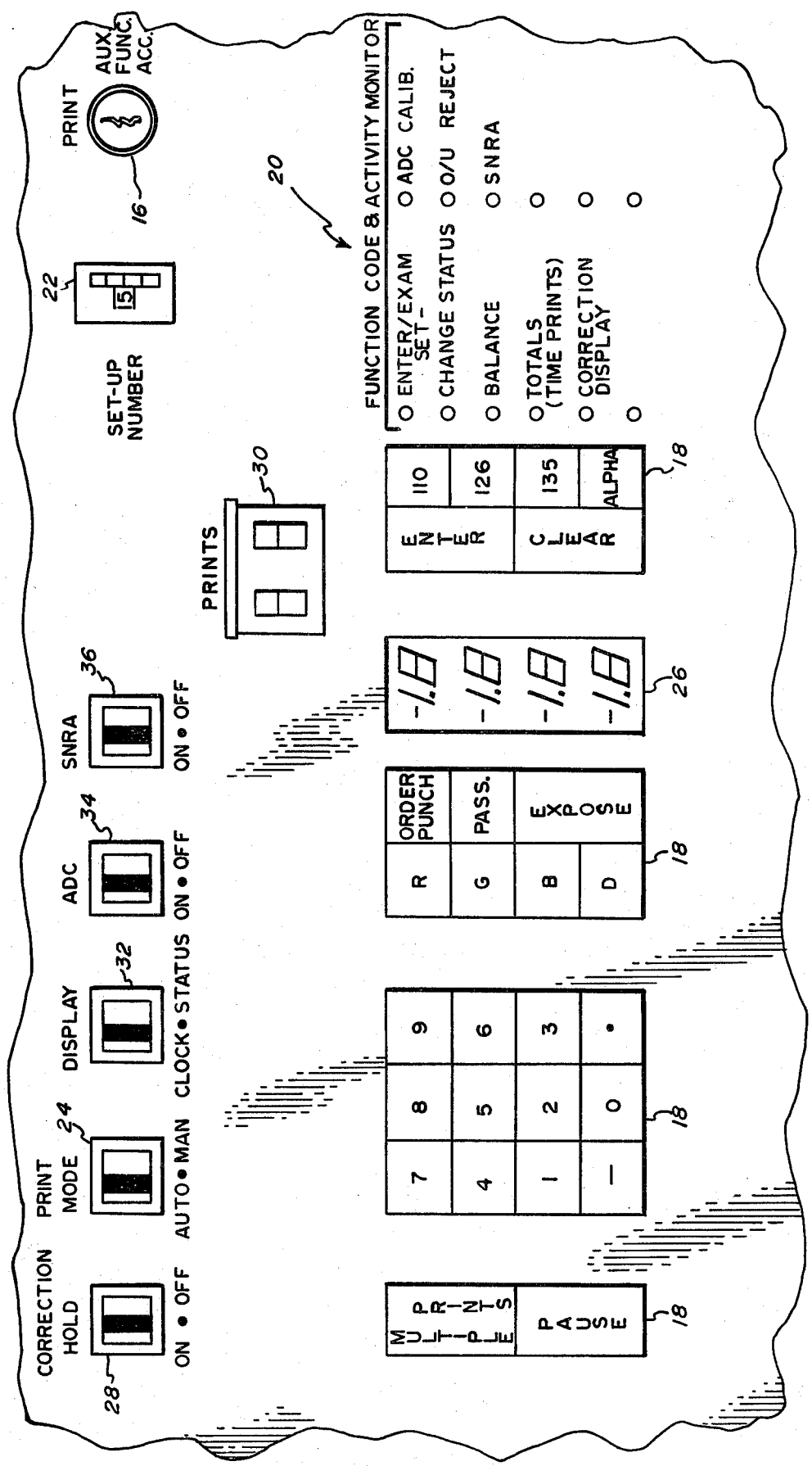
FIG. 2 shows the operator control panel of the photographic printer of FIG. 1.

FIG. 2 shows a top view of control panel 12. Access to the manager level is achieved by means of key-actuated switch 16, which permits access to the manager level only if a key (not shown) is inserted in switch 16 and switch 16 is turned to the "AUXILIARY FUNCTION ACCESS" position. The key is retained by an authorized person and is inserted only by that person when operation on the manager level is desired. During normal operation, the key is removed and the normal operator of the printer is not permitted access to the manager level. This prevents accidental or unauthorized changes to the various size setups, color balances, level settings and calibrations which have been entered and stored.

In other embodiments of the present invention, the security means which prevents normal access to the manager level may take forms other than key-actuated switch 16. For example, the access to the manager level may be provided by means of a secret code known only to authorized persons, a special button inaccessible to the normal operator, or a magnetically coded card which is inserted into a special slot by the manager. The specific form taken by the security means is not critical, provided it effectively prevents all unauthorized individuals from interacting with the printer on the manager level.

When the access or authorization condition has been met, display 14 prompts the manager through the necessary operations. It signals when to enter information through keyboard 18, and tells the manager to perform necessary actions during calibration and balancing procedures.

A function code and activity monitor 20 includes a list of function codes and an indicator light next to each function code. The list eliminates the need for ambiguous abbreviations on keypads of keyboard 18. The indicator lights show which function is being exercised.

In one preferred embodiment of the present invention, the manager may select one of eight functions performed on the manager level. The specific function is selected by entering the appropriate function code through keyboard 18.

"ENTER/EXAMINE SETUP" is a function in which the manager may enter or examine critical values for each setup. These critical values or parameters may include slope, paper gamma, slope centers, and density aim points.

"CHANGE STATUS" is a function in which information relating to the selected setup is displayed as a status message on display 14 during printing. This function enables entry and change of the informative messages for film type, size, and print format; control of automatic density correction (ADC), snow and beach scene correction (SNRA), filter paddle compensation (FPC), and entry of semi-permanent button corrections used to correct for minor temporary balance deviations.

"BALANCE" is a function which provides interactive color balancing of the printer. Printer 10 assists the manager through display 14 in achieving proper color balance.

"TOTALS" provide a running average of the red, green, and blue print times. The total number of prints in the average is also displayed.

"CORRECTION DISPLAY" provides a display during printing of all automatically determined corrections.

"ADC CALIBRATE" is performed at installation and at various intervals thereafter. This function leads the manager through a simple set of steps which require no electrical adjustments by the manager. The sensors used for automatic density correction are calibrated independently for all three film sizes.

"OVER/UNDER REJECT" allows adjustment by the lab manager of over and under reject levels.

"SNRA" permits the manager to enter a value which controls the sensitivity of a snow beach scene correction function.

On the operator level, the operator may select the particular setup block which contains previously stored parameters for exposure control calculation. Setup select switch 22 is a thumbwheel switch used to select the particular setup block to be used.

A print cycle is initiated by depressing the "Expose" key. If print mode switch 24 is in the MANUAL position, a single exposure cycle occurs. Placing print mode switch 24 in the AUTO position causes continuous expose/paper feed/film feed cycles to occur after the Expose key has been depressed. The "Clear" key aborts a print cycle and clears any button exposure corrections, and the "Pause" key causes a momentary pause or halt in print cycles when print mode switch 24 is in the AUTO position.

Exposure corrections (i.e. "button corrections") are implemented through the numeric keys and the R, G, B, and D keys of keyboard 18. Color corrections are made by striking the R (red), G (green), or B (blue) key 20 followed by the numeric value key. When color and density corrections are entered simultaneously, the D (density) button is used similarly to the R, G, or B buttons. Display 26 displays the particular button correction entered by the operator.

A correction recall feature is available by placing correction hold switch 28 in the ON position. This causes any succeeding prints to be printed with the presently displayed buttoning values. If switch 28 is OFF, printing occurs with no buttoned corrections, unless new corrections are entered for each print.

The "Order Punch" key indicates to printer 10 that the final print of an order has been made. An appropriate end-of-order mark is placed on the print paper so that the end of the order can be sensed by an automatic paper cutter or print sorter.

The "Pass" key permits the operator to skip certain frames of the film strip.

The "Multiple Prints" key permits multiple prints to be made of the negative, depending upon the number entered by the operator through keyboard 18 after depressing the "Multiple Prints" key. A display 30 positioned indicates the number of prints remaining if multiple prints have been selected.

Display switch 32 permits the operator to select the information which display 14 displays during printing. The CLOCK mode causes display 14 to display the print time and button corrections, while the STATUS mode causes display 14 to display key variables, status, labels, and semi-permanent button corrections for the selected setup.

The "ADC" and "SNRA" switches 34 and 36 control whether automatic density and snow scene corrections will be applied during printing.

In one embodiment, the operator may control whether the corrections are on or off, but the sensitivities of the corrections applied are determined on the manager level.

FIGS. 3A and 3B illustrate display 14 of printer 10 during two different operations. In FIG. 3A, display 14, which is preferably a 32-character alphanumeric display, is displaying "REFER DENSITY= ". This operation, which occurs during the "ENTER/EXAMINE SETUP" function on the manager level, is requesting that the lab manager enter red, green, and blue print density aim points for prints from a selected reference negative.

In FIG. 3B, display 14 is displaying information of a specific setup block. This information has been entered by the lab manager through interaction on the manager level during the "CHANGE STATUS" function. The information is displayed during the "CHANGE STA- TUS" function, and also is displayed when the operator selects that setup block. The information will be displayed throughout the normal printing operation if display switch 32 is in the STATUS position. The operator, whose interactions with printer 10 are limited to the operator level, cannot change any of the values or information displayed on display 14. In the embodiment shown in FIG. 3B, the ID number, type, size, and with border or borderless ("WB/BL") portions of the display are informational fields, indicating the ID number of the sub-block, the type of film, the size, and whether border of borderless prints are to be made. The remaining information indicates whether automatic density corrections ("ADC"), snow scene correction ("SNRA"), and filter paddle compensation ("FPC") have been selected and whether any semi-permanent overall density or red, green, or blue density corrections have been entered by the lab manager. The "mode" information indicates whether auto, manual, or test mode has been selected by the operator.

FIG. 4 shows an electrical block diagram of one embodiment of the exposure control system of the present invention. In this embodiment, a microprocessor 60 controls the exposure control functions and interacts through interface 62 with circuits 64, 66, 68, 70, and 72. These circuits coordinate the activities of microprocessor 60 with control circuits (not shown) which control other machine functions such as film and paper feed. Microprocessor 60 is associated with this memory 74, which preferably includes both random access memory (RAM) and read only memory (ROM). Exposure control 76 is provided in the preferred embodiment to relieve microprocessor 60 of some of the counting and updating functions required in controlling exposure. This permits microprocessor 60 to devote a larger percentage of its processing time to calculating the desired exposure and exposure corrections based upon input signals from a number of different sources.

Among the sources of input signals to microprocessor 60 are signals from large area transmission density sensors 78 and automatic density correction sensor array 80. The signals from these sensors are amplified by their respective amplifiers 82 and 84 and are multiplexed and converted to digital signals by multiplex and A/D conversion circuitry 86.

Microprocessor 60 interacts with control panel 12 and display 14 through operator interface circuitry 88. It is through control panel 12, display 14, and operator interface circuitry 88 that microprocessor 20 receives commands from the user and supplies information and instructions to the user.

Figure 5:
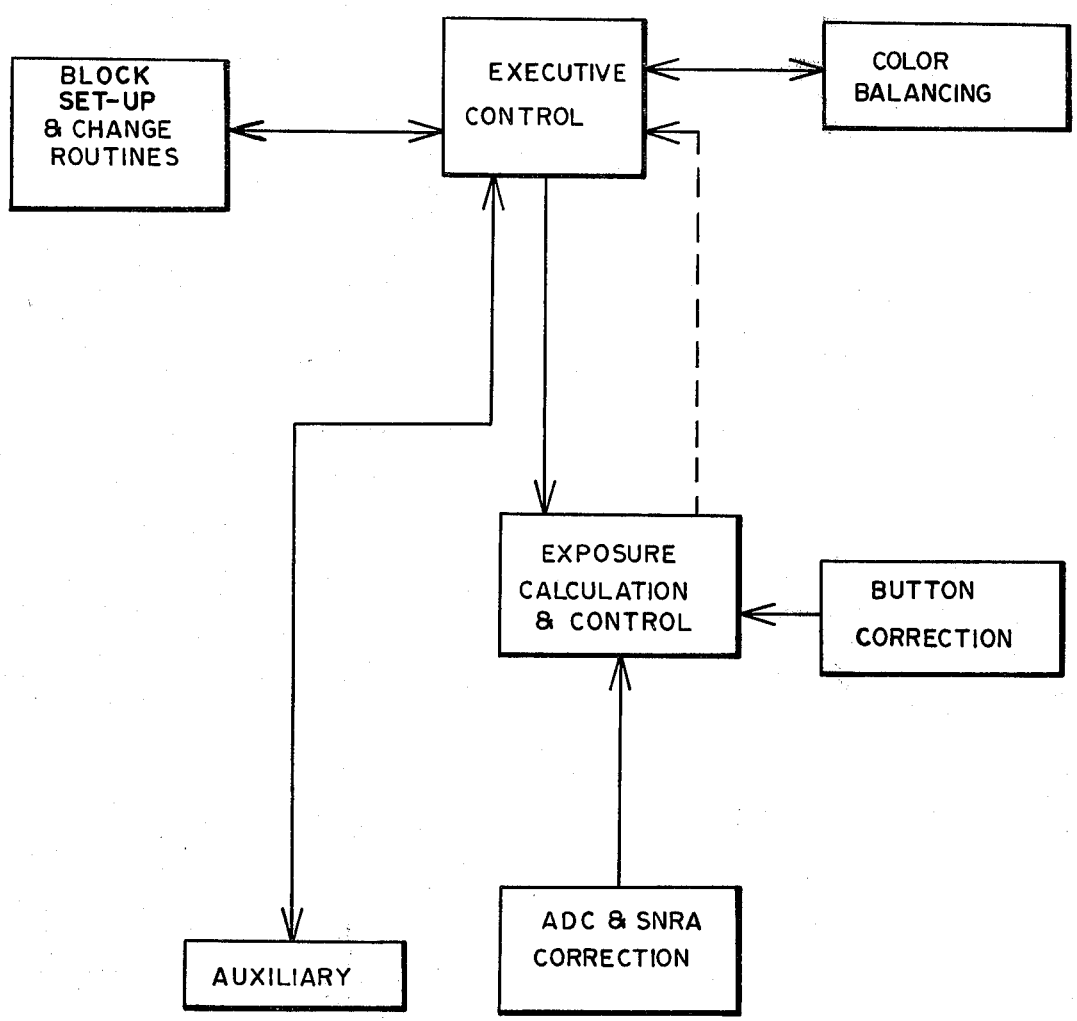
FIG. 5 is a functional block diagram showing the control functions performed by the control system of FIG. 4.

FIG. 5 is a functional block diagram illustrating the functions performed by microprocessor 60. As previously stated, in the embodiment shown in FIG. 4, the operations of microprocessor 60 are limited to exposure control related functions, such as printer setup, exposure, display, shutter and filter paddle control and operator interaction with the printer. The microprocessor does not control film/paper advance, paper punches, print lamp intensity, and lens deck positioning. These functions are performed by other control circuits (not shown) which are coordinated with microprocessor 60 through control circuits 64, 66, 68, 70, and 72.

The executive control function of microprocessor 60 selects and continually updates the setup block being used by the printer. The executive control displays status information on display 14 and determines the next sequence of operations to be executed by the microprocessor 60.

The setup and change routines are a series of interactive routines which allow the user to change critical printing parameters and display information. In addition, it allows the user to monitor totalized time, set over/under reject, and the snow scene correction (SNRA) level. Commands relating to the setup and change routines are accepted only on the manager working level. Only authorized persons can affect operation in the setup and change routines.

Color balancing is an interactive routine which allows the user to color balance the printer in the fastest time with minimal effort. Once again, the color balancing routine is controlled on the manager level.

Button corrections accept density and color corrections from the user through keyboard 18 and transforms these corrections into values related to exposure. In a preferred embodiment of the present invention, button corrections can be made on both the operator level and manager level.

Exposure calculation and control accepts sensor LATD information, applies slope, color balance, buttoning, and ADC/SNRA corrections, and yields values which reflect the desired exposure. The exposure is then initiated and monitored and terminated at the proper time. Filter paddle compensation may also be applied during exposure if applicable. The operator may initiate exposure on the operator level, but cannot vary the critical parameters used in the exposure calculations.

The ADC/SNRA corrections are calculated for the next negative to be printed. These corrections are then stored and applied during the next exposure cycle. The setup and calibration of these corrections is made on the manager level.

The auxiliary control covers general changes to machine status and utility subroutines. These include calibrating ADC sensor array 80, modifying button increments, changing over/under reject level, and other calibration procedures. All of the routines performed in the auxiliary control function are made on the manager working level.

Figure 6:
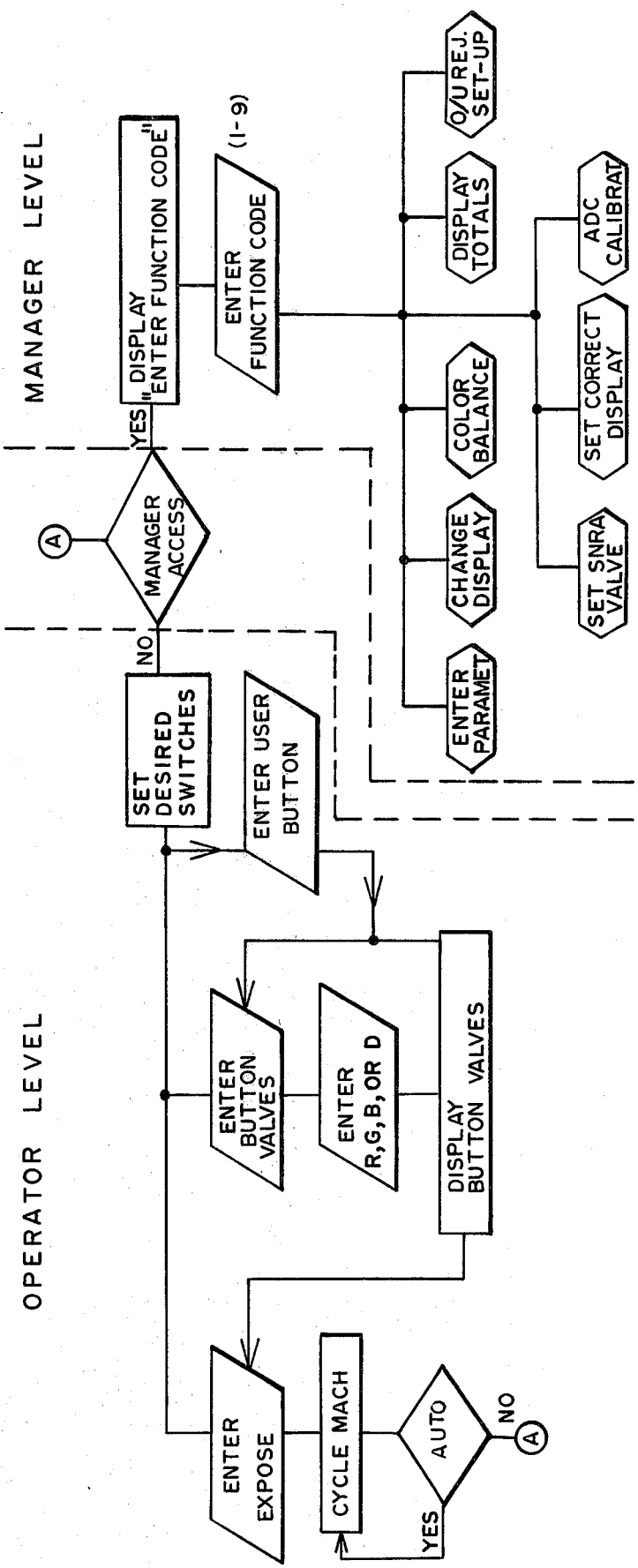
FIG. 6 is a more detailed functional block diagram illustrating the printer control organization of the present invention in which two separate working levels are provided.

FIG. 6 illustrates a simplified functional block diagram illustrating the operations performed on the operator level and the manager level. The initial determination made by microprocessor 60 is whether the key-actuated switch 16 is in the AUXILIARY FUNCTION ACCESS position. If it is in the AUXILIARY FUNCTION ACCESS position, microprocessor 60 causes display 14 to display "ENTER FUNCTION CODE". The lab manager then enters the appropriate function code through keyboard 18. Depending upon the code entered, one of the operations possible on the manager level is performed. FIG. 6 shows the eight previously-discussed functions which may be performed on the manager level. It should be understood, however, that other functions may be included on the manager level, or that some of these functions may not be present in all printers utilizing the present invention. In general, these functions are of a critical nature to the machine operation and should be protected from unauthorized or accidental modification by the normal operator.

When one of the manager level functions has been completed, microprocessor 60 again interrogates the status of key-actuated access switch 16. If switch 16 is still in the AUXILIARY FUNCTION ACCESS position, display 14 again displays "Enter Function Code".

The manager may then select another function on the manager level by entering a different function code. By this process, the critical parameters for each setup block, the color balancing, calibration, and totalizing of the printer are performed.

After the manager has completed his operations, he switches key-actuated switch 16 to the PRINT position and removes the access key. With key-actuated switch 16 in the PRINT position, any further switching or data entry through control panel 12 is restricted to the operator level.

As shown in FIG. 6, when key-actuated access switch 16 is in the PRINT position, microprocessor 60 first interrogates the status of the various switches such as setup select switch 22. The display information for the selected setup is displayed on display 14, as illustrated in FIG. 3B.

The operator may then enter desired button corrections through keyboard 18. The R, G, B, or D corrections are entered and displayed on display 26. When the operator has completed entering the button values, or if no button corrections are to be made, the operator then depresses the Expose key, which causes a print cycle to be performed. At the end of the print cycle, microprocessor 60 interrogates the status of Print Mode switch 24 to determine whether it is in the AUTO or MANUAL position. If it is in the AUTO position, another print cycle is immediately commenced. If, on the other hand, switch 24 is in the MANUAL position, microprocessor 60 awaits further print cycles. When instructions are received, microprocessor 60 again interrogates the status of key-actuated access switch 16 to determine whether the operation will be on the manager level or the operator level.

In conclusion, the photographic printer control system of the present invention provides two separate working levels on which operation can occur. Only authorized persons are permitted access to the manager level on which critical operating parameters, determination of operating parameters for each setup block, color balancing, calibration and totalizing occur. The permissible operations on the operator level are significantly limited, thereby allowing a relatively unsophisticated operator to operate the printer. Unauthorized or accidental operation on the manager level is prevented.

Although the present invention has been described with reference to preferred embodiments, workers skilled in the art will recognize that changes may be made in form and detail without departing from the spirit and scope of the invention.

What is claimed is:

1. In a photographic printer, the improvement comprising:
    storage means for storing alterable digital control information used to control printing, the control information including printer operating parameters for a plurality of setups for different film/photosensitive medium combinations;
    digital processor means for controlling operation of the printer as a function of the stored alterable digital control information, the digital processor means controlling operation of the printer on first and second working levels, the first working level including initiating printing, applying user selected density corrections, selection of an automatic or manual printing mode, and selection of one of the plurality of setups, and the second working level including altering the alterable digital control information;
    user input means for supplying input signals to the digital processor means to affect operation on the first or second working levels; and
    security means for normally permitting input signals supplied by the user input means to affect operation of the printer only on the first working level, and permitting input signals supplied by the user input means to affect operation of the printer on the second working level only if an authorization condition has been met.

2. The invention of claim 1 wherein the printer operating parameters include slope values.

3. The invention of claim 2 wherein the printer operating parameters include slope center values.

4. The invention of claim 1 wherein the printer operating parameters include density aim points.

5. The invention of claim 1 wherein the control information includes color balance.

6. The invention of claim 1 wherein the second working level further includes calibration of printer subsystems.

7. The invention of claim 1 wherein the control information includes totals of operating information.

8. The invention of claim 1 wherein the control information includes selection of automatic corrections to be applied during printing.

9. The invention of claim 8 wherein the automatic corrections include automatic density correction, snow/beach scene correction, filter paddle compensation and semi-permanent button corrections.

10. The invention of claim 1 wherein the security means comprises key-actuated switch means and wherein the digital processor means interrogates the status of the key-actuated switch to determine whether operation on the second working level is permitted.

* * * * *